United States Patent [19]

Bahr

[11] Patent Number: 6,029,246

[45] Date of Patent: Feb. 22, 2000

[54] NETWORK DISTRIBUTED SYSTEM FOR UPDATING LOCALLY SECURED OBJECTS IN CLIENT MACHINES

[75] Inventor: Terry S. Bahr, Santa Clarita, Calif.

[73] Assignee: Symantec Corporation, Cupertino, Calif.

[21] Appl. No.: 08/829,609

[22] Filed: Mar. 31, 1997

[51] Int. Cl.[7] ............................ G06F 12/14; H04L 9/00
[52] U.S. Cl. ..................... 713/200; 713/201; 709/202; 709/225
[58] Field of Search .................... 395/186, 187.9, 395/188.01, 680, 682, 683, 200.33, 200.32, 200.55; 713/200, 201, 202; 709/203, 202, 225

[56] References Cited

U.S. PATENT DOCUMENTS

| | | | |
|---|---|---|---|
| 5,608,903 | 3/1997 | Prasad et al. | 395/187.01 |
| 5,623,601 | 4/1997 | Vu | 395/187.01 |
| 5,649,099 | 7/1997 | Theimer et al. | 395/186 |
| 5,664,098 | 9/1997 | Bianchi et al. | 395/186 |
| 5,675,782 | 10/1997 | Montague et al. | 395/187.01 |
| 5,677,851 | 10/1997 | Kingdon et al. | 395/187.01 |
| 5,727,145 | 3/1998 | Nessett et al. | 395/186 |
| 5,729,689 | 3/1998 | Allard et al. | 395/200.58 |
| 5,729,734 | 3/1998 | Parker et al. | 395/187.01 |
| 5,742,759 | 4/1998 | Nessett et al. | 395/187.01 |
| 5,802,367 | 9/1998 | Held et al. | 395/685 |

OTHER PUBLICATIONS

Kiuchi et al., "C–HTTP—The Development of a Secure, Closed HTTP Based Network on the Internet", Proceedings of SNDSS, IEEE, pp. 64–75, 1996.

Microsoft Corporation, "Microsoft WindowsNT Workstation Resource Kit" (1996), Chapters 5, 6 and 24.

Microsoft Corporation, "System Policies Overview" (Oct. 1996), Windows 95 Resource Kit—MSDN Library (CD–ROM).

Microsoft Corporation, Simple Network Management Protocol (SNMP)—MSDN Library (Oct. 1996), Sections Entitled: "Policy Downloading", "Using the System Policy Editor", "Policy Editor User Interface", "Template File Format", "Categories", "Policies", "Policy Parts", "Part Types", "Action Lists", "Comments", "Policy File Format", "Control Codes", "Computers Key", "Groups and Group-Data Keys", "Users Key" and "Misc Key".

*Primary Examiner*—Dieu-Minh T. Le
*Attorney, Agent, or Firm*—Fliesler, Dubb, Meyer & Lovejoy LLP

[57] ABSTRACT

Technique for allowing real time centralized administration of protected objects on client computer systems. When a user logs on to a centrally administered client machine on a computer network, an intermediary object modification process starts in the background with administrator account permissions. Thereafter, whenever the administrative agent on the client computer system unsuccessfully attempts to perform an operation on a protected object for which the logon user lacks sufficient permission to perform, the agent passes a request to the intermediary process to perform the operation. The intermediary process is able to perform the desired operation because it has sufficient permission to do so even if the administrative agent does not.

27 Claims, 4 Drawing Sheets

NETWORK DISTRIBUTED SYSTEM FOR UPDATING LOCALLY SECURED OBJECTS IN CLIENT MACHINES

COPYRIGHT DISCLAIMER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND

1. Field of the Invention

The invention relates to techniques for centralized administration of networked computers, and more particularly, to techniques for such centralized administration where administered objects on client machines require security permissions before they can be modified.

2. Description of Related Art

Many modern computer systems and computer operating systems incorporate security measures which operate to protect the various components in the computer—hardware, software and data—from unauthorized use, theft, and intended or unintended damage. The Microsoft® WindowsNT® operating system, for example, provides a number of such security features. The WindowsNT security model is described in Chap. 6 of "Microsoft WindowsNT Workstation Resource Kit", Microsoft Press (1996). This entire book is incorporated herein by reference.

In the WindowsNT security model, the operating system maintains security information about each user, group and object. As used herein, an object is anything in the system for which permissions are checked before an operation on it is allowed. In WindowsNT, objects include, but are not limited to, directory objects, object-type objects, symbolic link objects, semaphore and event objects, process and thread objects, section and segment objects, port objects, file objects, the WindowsNT registry, the various nodes within the WindowsNT registry, and the various key names and values in the WindowsNT registry. Users and groups are assigned specific "permissions" which grant or deny access to particular objects.

When a user logs on to a WindowsNT network, the operating system creates a security access token for the user, which includes all of the permissions for the user and for the groups to which the user belongs. Every process that runs on behalf of the user is then given a copy of the user's security access token. Whenever a process attempts to access an object, the operating system compares the permissions listed in the security access token for the process with the list of access permissions for the object to ensure that the process has sufficient permission to access the object. One objective of the security model used in WindowsNT is to ensure that the programs which a user runs do not have greater access to objects than the user does.

In WindowsNT, the types of permission that can be granted or denied for a particular object are dictated by the type of the object. For example, for a printer queue object, permissions that can be specified include whether a user or group can manage documents and/or can print documents. For a registry entry, permissions include whether a user or a group can read, write, modify, rename, and so on. Objects for which access is to be controlled are assigned an access control list (ACL), made up of access control entries (ACEs). Each ACE specifies a particular user or group and indicates what type of access (i.e. which operations) that user, or members of that group, are permitted to perform on the object. For registry nodes and registry entries, the following types of access can be specified in an ACE:

Query Value
Set Value
Create Subkey
Enumerate Subkeys
Notify
Create Link
Delete
Write DAC
Write Owner
Read Control The WindowsNT registry and registry administration are described in Chap. 24 of the above-incorporated WindowsNT Workstation Resource Kit book.

The WindowsNT object and user permissions mechanism is not to be confused with the distinction between kernel mode and user mode of the central processing unit. Kernel mode is also known as privileged mode, supervisor mode, protected mode or Ring 0. The WindowsNT 4.0 Workstation architecture, including a description of portions of the operating system that operate in user or kernel mode, is described in Chap. 5 of the above-incorporated WindowsNT Workstation Resource Kit book. Protected modes are also described in "Pentium Architecture and Programming Manual" (1995), incorporated herein by reference.

In a default installation of WindowsNT, a number accounts are predefined. These include a system account as well as an administrator account. The owner of an object has complete discretion to grant or deny permissions to any account, including the administrator; but the administrator always retains the ability to take ownership of an object and thereby increase the permissions granted to the administrator.

In a default installation of WindowsNT, permissions are automatically set on certain components of the registry that allow work to be done while providing a standard level of security. For example, the registry nodes containing configuration information for application software usually grant "Full Control" permission to the creator/owner, to the system account, and to the administrator account. But the registry nodes containing configuration information about local machine hardware components usually grant "Full Control" permission only to the system account and the administrator account. The group "Everyone" is often granted only "Read" permission.

In most cases, where access to a registry entry by ordinary users is controlled, the administrator by default is nevertheless given full access.

Numerous business and academic settings today deploy a large number of computer systems all connected together via a computer network. For large computer networks, the administration costs can become extremely burdensome unless all of the computers can be administered from one or a few central locations. Responding to this need, a number of centralized network administration products have been developed. Two such products are the Norton Administrator for Networks (NAN) and the Norton Desktop Administrator (NDA), both available from Symantec Corporation, Cupertino, Calif. Both of these products provide a wide variety of centralized administration functions. Many of these functions involve updating the registry on various client computers around the network. The Norton Administrator for Networks, for example, contains a registry modification feature that allows the network administrator to modify registry entries on client machines without having to be physically present at their machines. The Norton Desktop Administrator allows the network administrator to set policies on client machines, which also involves modifying certain registry keys. The latter product allows the network administrator from a central machine to set certain policies on client machines to prohibit them from doing certain tasks, such as by turning off the "run" option on the start menu, removing the ability to get a DOS prompt, and so on. These policies are all defined in registry settings on the client machine.

In order to minimize network traffic and also minimize the load on the central administrative server, the above two products follow a model under which a database is maintained on a central administrative server (not necessarily the same server which is running the network administration software), which indicates all the various updates that need to be made on each particular machine on the network. For example, if an administrator using NDA specifies that the value of a particular registry entry on machine X needs to be updated to a value Y, then NDA will enter that command into the centralized administrative database. (As used herein, the terms "command", "instruction" and "request", and similar terms, are used interchangeably.) An agent process runs on each of the computers on the network, and periodically, for example every 15 minutes, the agent process queries the centralized administrative database to determine whether any new instructions have been entered for that particular computer. If so, then the instruction is downloaded and executed by the agent process. For example, if the agent running on machine X queries the database, it will learn that it is being instructed to modify the value of the particular registry entry to the value Y. The agent performs the specified operation on the local registry in machine X.

When administrative agents start up on client machines, they start up in the same security context as the user's logon account. A problem arises because with the security features of Microsoft WindowsNT 3.5.1 and 4.0, the default permissions on certain registry entries do not permit ordinary users to modify such entries. That is, the user's logon account, and hence the administrative agent running on the user's computer system, lacks sufficient permission to modify certain registry entries. Accordingly, if the agent is instructed by the centralized administrative database to update one of these protected registry entries, the operation will fail. Conventional centralized network administration products, therefore, are not able to centrally administer all objects on WindowsNT 3.5.1 and higher client machines.

Two conventional techniques exist for overcoming this problem. First, the Microsoft WindowsNT operating system comes with a tool, REGEDT32.EXE which the administrator can use from the administrator's central machine, to perform remote registry modifications on client computers. Because the administrator is logged on under the administrator account, the REGEDT32 program has sufficient permission to make the modifications desired even in highly protected registry entries on client machines.

However, use of REGEDT32 is quite cumbersome. It is also quite impractical for large networks having thousands of client computer systems, because the registry entry modifications require the central administrative computer system to connect to each client computer individually and sequentially, make the required modification, and then disconnect. Even if the process could be automated, it is still quite slow to connect, modify and disconnect to each machine in sequence. Furthermore, such a technique runs counter to the overall model of network administration products such as NAN and NDA, in which most of the administrative work is offloaded to the client machines.

A second conventional technique for centrally administering protected registry entries on client machines involves the use of the WindowsNT system policy downloader. The operation of the system policy downloader is described in "Simple Network Management Protocol (SNMP)", MSDN Library (October 1996) (CD-ROM), incorporated herein by reference. When using the system policy downloader, the administrator creates a system policy file either on the client machines or in a central network location, indicating policies that are to be enforced, deleted, or left to the individual client user's discretion. Whenever a user logs on to a client machine on the network, the client automatically looks for a system policy file and, if detected, merges the policies specified therein into the client machine's registry.

This too is not a viable solution for the problem of centralized administration of protected objects, because it will operate only to update registry policies. The WindowsNT registry also contains many other entries, other than policies, which may be protected and which need to be centrally administered. In addition, policy modifications specified using a system policy file do not take effect until client users log out and log back in. The actual registry updates therefore do not necessarily take place for hours or days, a situation which is unacceptable for many networks.

Accordingly, there is a significant need for a new mechanism which will allow for centralized administration of protected objects on client computer systems.

SUMMARY OF THE INVENTION

According to the invention, roughly described, an intermediary process is installed on each client machine. Typically the intermediary process is installed as an NT service. When the client machine boots up, the intermediary service automatically starts up with the administrator name and password. The service thus carries administrator permissions. Thereafter, whenever the administrative agent on the client computer system unsuccessfully attempts to modify a registry entry in response to a command from the centralized administrative server, the agent passes a request to the intermediary service to perform the modification. The intermediary service is able to perform the desired operation because it has sufficient permission to do so even if the administrative agent does not.

BRIEF DESCRIPTION OF THE DRAWINGS

The invention will be described with respect to particular embodiments thereof, and reference will be made to the drawings, in which.

DETAILED DESCRIPTION

Figure 1:
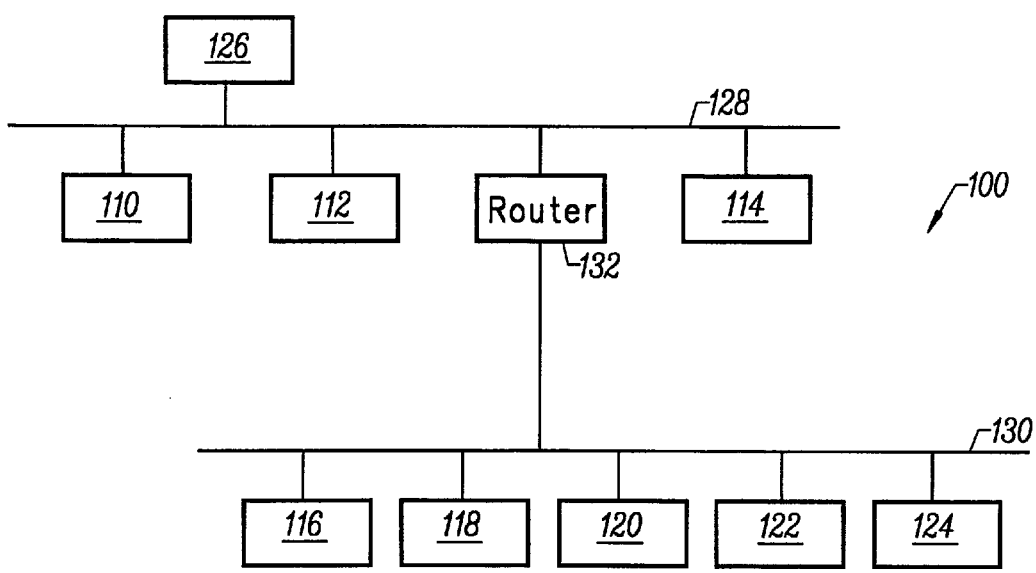
FIG. 1 is a symbolic block diagram of a computer network incorporating the invention.

FIG. 1 is a symbolic block diagram of a computer network 100 incorporating the invention. It includes client computer systems 110, 112, 114, 116, 118, 120, 122 and 124, all running WindowsNT Workstation 4.0, for example. Also connected to the network 100 is a centralized administration server 126, running WindowsNT Server 4.0. The network topology of FIG. 1 includes two subnets 128 and 130 connected together via a router 132, but the invention can be used with any network topology including local area networks (LANs) and wide area networks (WANs).

The central administration server 126 runs various conventional network administration programs, including one which is able to distribute software and install it remotely on the various client machines. This tool is used to install two programs on each client machine. The first is an administrative agent which periodically queries the administrative database on the central administrative server 126 and attempts to execute instructions specified for the client machine. The second is an intermediary process, called a registry modification service, which runs as an NT background service with administrator permissions on the client machine. As used herein, the term "process" refers to executing programs, parts of executing programs, NT "services", and so on.

Figure 2:
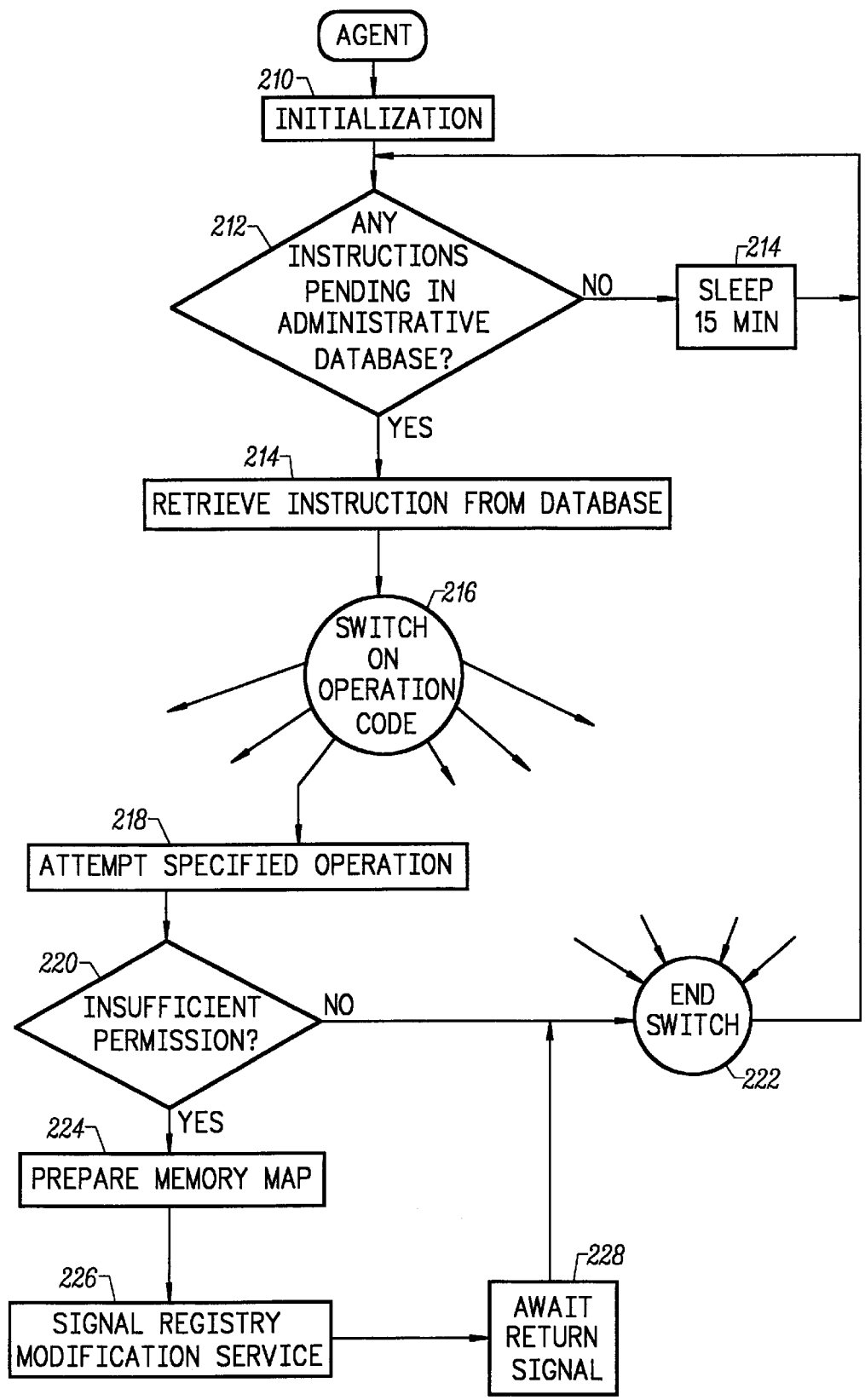
FIG. 2 is a symbolic flow chart of the administrative agent process flow in an embodiment of the invention.

FIG. 2 is a symbolic flow chart illustrating the steps performed by the administrative agent running on the client machine. In a step 210, the agent performs its initialization functions. Among other things, step 210 includes locating the shared data directory which contains the database of administrative instructions. The agent enumerates all waiting job activity that matches the local machine's current logon user name and builds a list of things to be modified by the agent. These are essentially the instructions or commands from the centralized administrative server to the local client machine.

In step 212, the agent determines whether there are any instructions pending in the administrative database for the local machine's current logon user name. If not, then the agent process goes to sleep for a fixed period of time, for example 15 minutes. When it awakes, it returns to step 212 to check for any new instructions.

If there are instructions in the administrative database for the local machine's user name, then in step 214, an instruction is retrieved from the database. Part of the instruction includes an operation code, which indicates the type of operation which the agent is to perform. Not all operations relate to the registry, but those that do generally call for either adding, modifying, renaming or deleting a registry key or registry value.

In step 216, in response to the instruction, the agent process switches on the operation code. For simplicity of illustration, only one branch of the switch is shown in FIG. 2, but it will be understood that each operation code or group of similar operation codes has its own branch.

In step 218, the agent process attempts to perform the specified operation on the registry, using the standard WindowsNT application program interface (API) calls for registry modification. In a step 220, it is determined whether the operation has failed for insufficient permission. If the operation succeeded, then the end of the switch statement is reached in step 222 and the agent process returns to step 212 to determine whether there are any further instructions pending for the local client machine. The operation will not fail for insufficient permission, for example, if the target registry entry is not protected.

If the target registry entry is protected, such that the agent process (running with the user's permissions) does not have sufficient permission to perform the operation specified on the registry entry, then the agent process makes a request to the intermediary registry modification service to perform the operation. Specifically, in step 224, the agent process fills in a data structure in a shared memory map shared with the registry modification service, with information about the desired operation and the desired object. Whereas the present embodiment uses a shared memory region for interprocess communication, it will be understood that other embodiments can use other forms of interprocess communication. In step 226, the agent process signals the registry modification service that a request is waiting. The agent process then enters a waiting state (step 228) until a return signal is received from the registry modification service, at which point control returns to the End Switch statement 222. The registry modification service is able to perform the requested operation on the specified object even if the administrative agent process is not, because the registry modification service is running with administrator permissions.

The steps 218, 220, 224, 226 and 228 in FIG. 2 set forth the import, but necessarily the exact sequence of steps which the agent process performs with respect to each registry operation that can be specified in the administrative database. Appendix A hereto sets forth in C++ the actual steps which the agent performs. Table I lists the registry operations to which the agent process will respond.

TABLE I

| Operation Code | Description |
| --- | --- |
| Open | Open or create a registry key |
| Close | Close a registry key |
| SetValue | Set the value of a registry entry |
| QueryValue | Return the value of a specified registry key |
| GetNumKeys | Return the number of subkeys |
| GetNumValues | Return the number of value entries |
| QueryKey | Returns Boolean indicating whether the key exists |
| RenameValue | Renames a value |
| EnumKey | Returns information about the next subkey of a specified key |
| EnumValue | Returns the next value of a specified key |
| DeleteKey | Delete a registry key and all its descendants |
| CopyKey | Copies a key and its value to a different branch |
| MoveKey | Moves a key and its value to a different branch |
| DeleteValue | Delete a key value |

The data structure which the agent process prepares in the memory map in step 224 in FIG. 2, for communication with the registry modification service, is as follows:

| typedef struct { | //[Communication direction is as viewed by Service] | |
| --- | --- | --- |
| int | nAction; | //[in] predefined action |
| long | lReturn; | //[out]return code |
| WPARAM | wParam; | //[in]wparam info |
| LPARAM | lParam; | //[in]lparam |
| UINT | uMessage; | //[in]message type |
| HKEY | hKey; | //[in/out] registry key |
| TCHAR | szSubKey[0x800]; | //[in]sub key, 2k |
| TCHAR | szClass[MAX_PATH]; | //[in]key class |
| DWORD | dwValue; | //[in]value type, winSDK |
| TCHAR | szValue[0x800]; | //[in]value name, 2 k |
| DWORD | cbData; | //[in]data size |
| BYTE | bData[0x8000]; | //[in]data buffer, 32 k |
| }NDASRV_DATA; | | |

The agent process specifies the particular operation which the registry modification service is to perform, in the field nAction in the above data structure. nAction can take on any of the values in the following Table II.

TABLE II

| nAction | DESCRIPTION |
| --- | --- |
| NDASRV_REG_SETVALUE | Sets the value of a key |
| NDASRV_REG_ENUMKEY | Returns information about the next subkey of a specified key |
| NDASRV_REG_ENUMVALUE | Returns next value of a specified key |
| NDASRV_REG_QUERYVALUE | Returns type and data for a specified value name |
| NDASRV_REG_QUERYINFOKEY | Returns information about a specified key |
| NDASRV_REG_DELETEKEY | Deletes a key |
| NDASRV_REG_DELETEVALUE | Deletes a value for a specified key |

As mentioned, when the user boots up the client machine, the registry modification service starts with administrator permissions. The C++ language code that installs and starts the service is called NEFSERV, and is set forth in Appendix B hereto.

Figure 3:
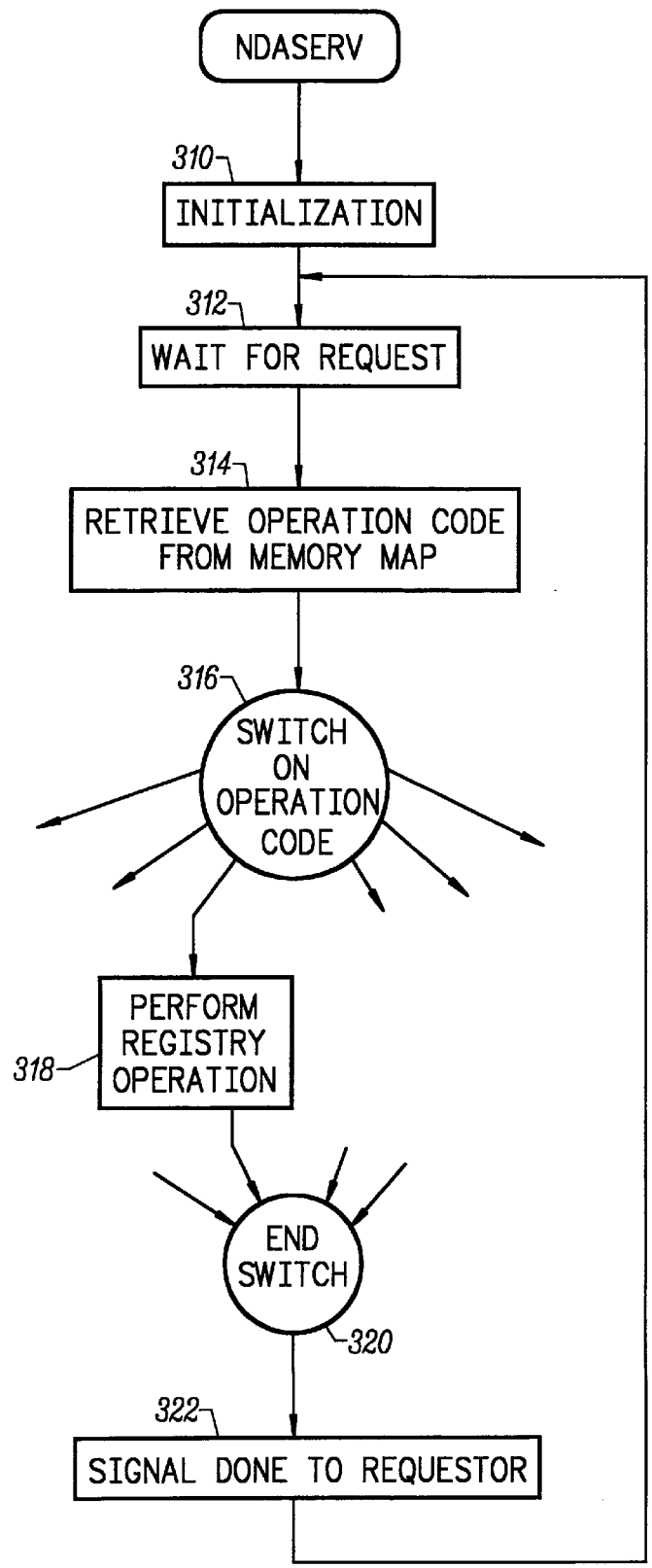
FIG. 3 is a symbolic flow chart of the intermediary registry modification service process flow in an embodiment of the invention.

FIG. 3 is a flowchart symbolically illustrating the operation of the registry modification service itself, NDASERV. In an initialization step 310, among other things, the service creates a shared memory region known as a memory map. It is through this memory map, as well as through the normal Windows NT signaling functions, that the administrative agent program communicates with the registry modification service.

After initialization, in step 312, the registry modification service waits for a request. When the administrative agent program signals the registry modification service that a request is pending, in step 314, in response to the request, the service retrieves the operation code of the request from the memory map. In step 316, it switches on the operation code. For simplicity of illustration, only one branch of the switch is shown in FIG. 3, but it will be understood that a separate branch exists for each operation code or group of similar operation codes.

In step 318, the registry modification service performs the operation specified by the operation code, on the object (registry key) specified in the memory map. Because the registry modification service was started with the administrator user name and password, it has sufficient permission to perform whatever operation the central administrative server has requested on the local client registry. After the operation is performed, the end of the switch statement is reached in step 320 and in step 322, the registry modification service signals a result code back to the administrative agent program. The registry modification service then loops back to step 312 to wait for the next request.

As mentioned in the above description, the registry modification service performs operations "in response to" requests from the local administrative agent process. As used herein, a given event is considered "responsive" to a predecessor event if the predecessor event influenced the given event. If there is an intervening processing step or time period, the given event can still be "responsive" to the predecessor event. If the intervening processing step combines more than one event, the result of the processing step is considered "responsive" to each of the event inputs.

Appendix C sets forth the C++ language code for NDASERV, which is compiled and loaded with NEFSERV.CPP (Appendix B).

It will be appreciated that many of the Windows API calls made in the code listings of Appendices A, B and C are well known to a person of ordinary skill. In any event, they are described on the Microsoft Developer Network CD-ROM (October 1996), incorporated by reference herein.

Figure 4:
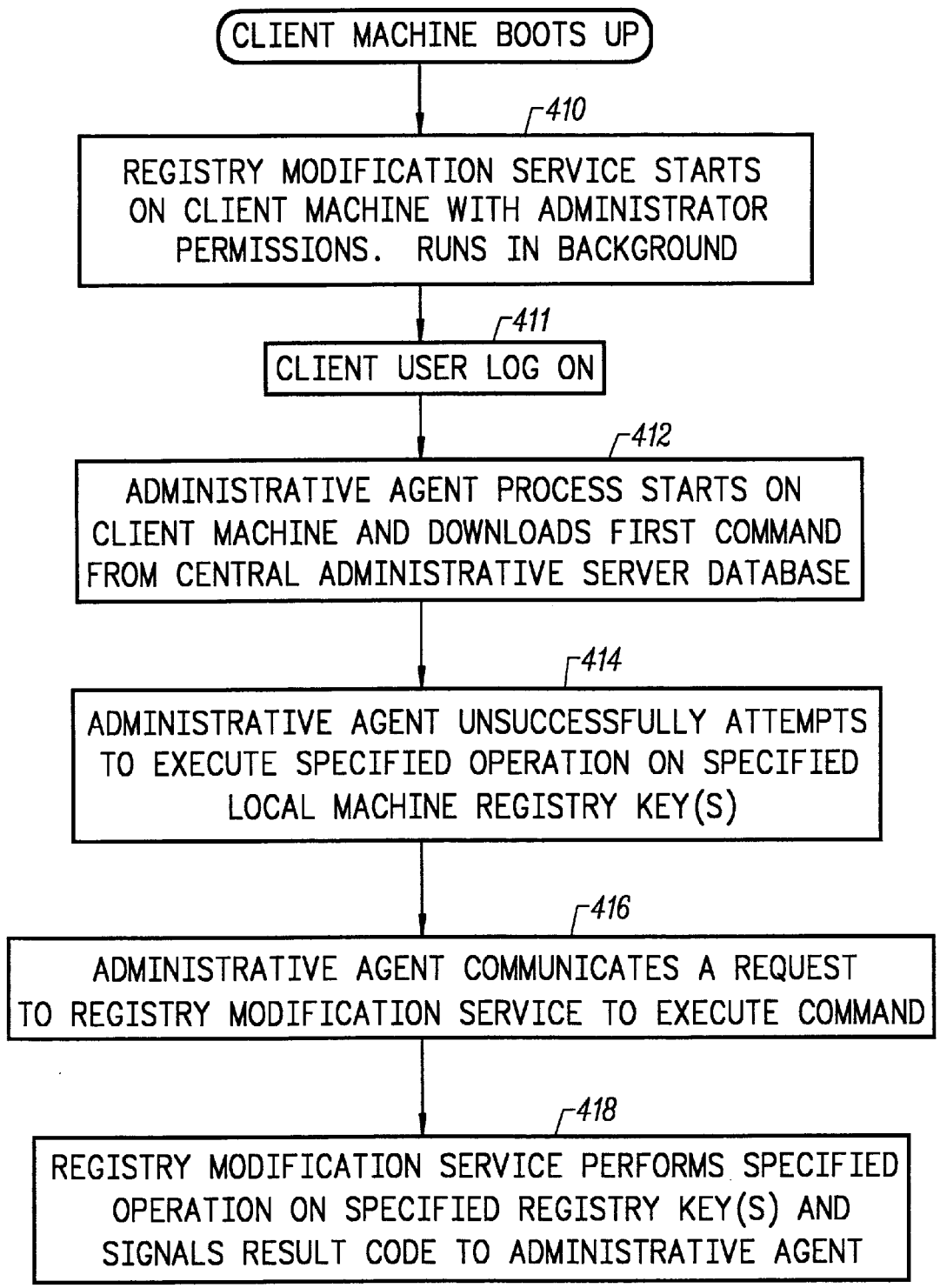
FIG. 4 is a symbolic flow chart of an example series of steps that take place on a client machine.

Given the above mechanism, FIG. 4 is a flowchart of a sample process which might take place on one of the client machines administered by the central administration server 126. In step 410, when the user boots up the client workstation, the registry modification service illustrated in FIG. 3 automatically starts. The registry modification service has administrator permissions and runs in the background. The user subsequently logs on in step 411.

In step 412, the administrative agent process of FIG. 2 also starts on the client machine, and downloads the first command from the central administrative server database. In step 414, the administrative agent unsuccessfully attempts to execute the operation specified in the command, on the local machine registry key(s). In step 416, in response to such unsuccessful attempt, the administrative agent communicates a request to the registry modification service to execute the command. In step 418, the registry modification service, which has sufficient permission to execute the command, performs the specified operation on the specified registry key(s) and signals a result code back to the administrative agent.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, the invention can be used with other protected objects on a computer system aside from registry keys. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

-23-

APPENDIX A
NDAREG.CPP

Excerpt from Administrative Agent Program
©1997 Symantec Corp.

```cpp
#include "stdafx.h"
#include "ndalib.h"

#ifdef SYM_WIN32
#include "nefserv.h"
#endif
////////////////////////////////////////////////////////////////////////////
// CRegistryKey CRegistryKey::CRegistryKey() : m_hKey( NULL )
{
        Init();
}

CRegistryKey::CRegistryKey( HKEY hKey, LPCTSTR pszSubKey, LPTSTR pszClass ) :
        m_hKey( NULL )
{
        Init();

Open( hKey, pszSubKey, pszClass );
}

CRegistryKey::CRegistryKey( HKEY hKey, UINT nResId, LPTSTR pszClass ) :
        m_hKey( NULL )
{
        Init();

// fetch subkey string from string-table
        CString strSubKey( nResId );
        Open( hKey, strSubKey, pszClass );
}

CRegistryKey::~CRegistryKey( )
{
        Close( );
}

/////////////////////////////////////////////
// Init void CRegistryKey::Init()
{
        m_hKey            = NULL;
        m_lStatus         = ERROR_SUCCESS;

#ifdef SYM_WIN32
        m_dwValues        = 0;
        m_dwSubKeys       = 0;
        m_bQueried        = FALSE;
        memset( &m_timeLastWrite, 0, sizeof( FILETIME ));

m_hKeyTop         = NULL;
        m_hNtMap          = NULL;
        m_hNtEvent        = NULL;
        m_pNtBuff         = NULL;
#endif
```

Attorney Docket No.: SYMA1026MCF/GGG/WSW
/wsw/syma/1026.001

-24-

```
        }
        ////////////////////////////////////////////////////////////////////////
        /*      Open
        */
        BOOL CRegistryKey::Open( HKEY hKey, LPCTSTR pszSubKey, LPTSTR pszClass )
        {
                DWORD                   dwDisposition = 0;
                CStringTokens   strToken;
                CStringExt              strSubKey;

#ifdef SYM_WIN32
                m_hKeyTop               = hKey;
                m_strSubKey             = pszSubKey;
                m_strClass              = pszClass;
        #endif // invalid subkey
                if ( strToken.Parse( pszSubKey, _T('\\') ) == 0 )
                        return FALSE;

for ( int i = 0; i < strToken.GetCount(); i++ )
                {
                        // close last subkey
                        if ( !Close() )
                                return FALSE;

// add sub key separator
                        if ( !strSubKey.IsEmpty() )
                                strSubKey += _T("\\");

// add sub key separator
                        strSubKey += strToken[i];

        #ifdef SYM_WIN32
                        // create/open registry key
                        SetLastError( RegCreateKeyEx( hKey, strSubKey,
                                0, pszClass,
                                REG_OPTION_NON_VOLATILE, KEY_ALL_ACCESS, NULL,
                                &m_hKey, &dwDisposition ));

if ( GetNtService() )
                        {
                            NDASRV_DATA* pData = (NDASRV_DATA*)m_pNtBuff;
                            pData->nType    = NDASRV_REG_OPEN;
                            STRCPY( pData->szSubKey, strSubKey );

RunNtService();
                        }
        #else
                        SetLastError( RegCreateKey( hKey, pszSubKey, &m_hKey ));
        #endif
                        if ( GetLastError( ) != ERROR_SUCCESS )
                                return FALSE;
                } return ( GetLastError( ) == ERROR_SUCCESS );
60      }

////////////////////////////////////////////////////////////////////////
        /*      Close
        */
        BOOL CRegistryKey::Close( )
        {
```

-25-

```
        if ( m_hKey == (HKEY)NULL )
                return TRUE;

SetLastError( RegCloseKey( m_hKey ));
        m_hKey = (HKEY)NULL;

return ( GetLastError( ) == ERROR_SUCCESS );
    }
////////////////////////////////////////////////////////////////////////////
    /*      SetValue
    */
    BOOL CRegistryKey::SetValue( LPCTSTR pszName, DWORD dwValue )
    {
    #ifdef SYM_WIN32
        if ( IsValid() )
                SetLastError( RegSetValueEx( m_hKey, pszName, 0, REG_DWORD,
                                    (LPBYTE)&dwValue, sizeof( DWORD )));
        if ( GetNtService() )
        {
            NDASRV_DATA* pData = (NDASRV_DATA*)m_pNtBuff;

            pData->nType       = NDASRV_REG_SETVALUE;
            pData->dwValue     = REG_DWORD;
            pData->cbData      = sizeof( DWORD );
            STRCPY( pData->szValue,    pszName );
            memcpy( pData->bData,      (LPBYTE)&dwValue, pData->cbData );
            RunNtService();
        }
    #else
        TCHAR szBuf[ MAX_PATH ];
        wsprintf( szBuf, _T( "%ld" ), dwValue );

SetLastError( RegSetValue( m_hKey, pszName, REG_SZ, szBuf,
                                    STRLEN( szBuf ) + 1 ));
    #endif
        return ( GetLastError( ) == ERROR_SUCCESS );
    }

BOOL CRegistryKey::SetValue( LPCTSTR pszName, LPCTSTR pszValue )
    {
    #ifdef SYM_WIN32
        DWORD cbData = STRLEN( pszValue ) + 1;

#ifdef UNICODE
        cbData = 2 * cbData;
    #endif if ( IsValid() )
                SetLastError( RegSetValueEx( m_hKey, pszName, 0, REG_SZ,
                                    (LPBYTE)pszValue, cbData ));

if ( GetNtService() )
        {
            NDASRV_DATA* pData = (NDASRV_DATA*)m_pNtBuff;
            pData->nType       = NDASRV_REG_SETVALUE;
            pData->dwValue     = REG_SZ;
            pData->cbData      = cbData;
            STRCPY( pData->szValue,    pszName );
            memcpy( pData->bData,      (LPBYTE)pszValue, pData->cbData );
```

-26-

```
                RunNtService();
        }
else
        SetLastError( RegSetValue( m_hKey, pszName, REG_SZ, pszValue,
                                   STRLEN( pszValue ) + 1 ));
endif return ( GetLastError( ) == ERROR_SUCCESS );
}

BOOL CRegistryKey::SetValue( LPCTSTR pszName, LPVOID pData, DWORD dwSize )
{
#ifdef SYM_WIN32
        if ( IsValid() )
                SetLastError( RegSetValueEx( m_hKey, pszName, 0, REG_BINARY,
                                             (LPBYTE)pData, dwSize ));

if ( GetNtService() )
        {
            NDASRV_DATA* pData = (NDASRV_DATA*)m_pNtBuff;

pData->nType        = NDASRV_REG_SETVALUE;
            pData->dwValue      = REG_BINARY;
            pData->cbData       = dwSize;
            STRCPY( pData->szValue,     pszName );
            memcpy( pData->bData,       (LPBYTE)pData, pData->cbData );

RunNtService();
        }
else
        SetLastError( RegSetValue( m_hKey, pszName, REG_SZ, (LPCTSTR)pData,
                                   dwSize ));
endif return ( GetLastError( ) == ERROR_SUCCESS );
}

////////////////////////////////////////////////////////////////////////
/*      QueryValue
*/
CString CRegistryKey::QueryString( LPCTSTR pszName )
{
        CString strValue;                       // storage for result value
        TCHAR szValue[SYM_MAX_PATH];            // storage for key value ifdef SYM_WIN32
        DWORD dwType;                           // data returned from query call
        DWORD dwSize = SYM_MAX_PATH;            // size of value buffer // retrieve key value
        if ( IsValid() )
                SetLastError( RegQueryValueEx( m_hKey, pszName, NULL, &dwType,
                                               (LPBYTE)szValue, &dwSize ));

if ( GetNtService() )
        {
            NDASRV_DATA* pData = (NDASRV_DATA*)m_pNtBuff;

pData->nType        = NDASRV_REG_QUERYVALUE;
            STRCPY( pData->szValue,     pszName );

if ( RunNtService( FALSE ))
                    memcpy( szValue, pData->bData, pData->cbData );

CloseNtService();
        }
```

-27-

```
        #else
                long lSize = SYM_MAX_PATH;

// retrieve key value
                SetLastError( RegQueryValue( m_hKey, pszName, szValue, &lSize ));
        #endif if ( GetLastError( ) == ERROR_SUCCESS )
                        strValue = szValue;
                return strValue;
        }

DWORD CRegistryKey::QueryDWord( LPCTSTR pszName )
        {
                DWORD dwValue = 0L;                     // storage for result value ifdef SYM_WIN32
                DWORD dwType;                           // type of data in registry key
                DWORD dwSize = sizeof( DWORD );         // data returned from query call // retrieve key value
                if ( IsValid() )
                        SetLastError( RegQueryValueEx( m_hKey, pszName, NULL, &dwType,
                                       (LPBYTE)&dwValue, &dwSize ));

if ( GetNtService() )
                {
                    NDASRV_DATA* pData = (NDASRV_DATA*)m_pNtBuff;
 30
                        pData->nType       = NDASRV_REG_QUERYVALUE;
                        STRCPY( pData->szValue,     pszName );

if ( RunNtService( FALSE ))
                                memcpy( &dwSize, pData->bData, pData->cbData );

CloseNtService();
                }
        #else
        TCHAR szValue[SYM_MAX_PATH];
        long lSize = SYM_MAX_PATH;

SetLastError( RegQueryValue( m_hKey, pszName, szValue, &lSize ));

               if ( GetLastError( ) == ERROR_SUCCESS )
                        dwValue = (DWORD)atoi( szValue );
        #endif return dwValue;
        } ifdef SYM_WIN32

///////////////////////////////////////////
        // GetNumKeys

DWORD CRegistryKey::GetNumKeys()
        {
                if ( QueryKey() )
                        return m_dwSubKeys;

return 0L;
        }

       ///////////////////////////////////////////
        // GetNumValues
```

Attorney Docket No.: SYMA1026MCF/GGG/WSW
/wsw/syma/1026.001

−28−

```
       DWORD CRegistryKey::GetNumValues()
       {
               if ( QueryKey() )
                       return m_dwValues;
               return 0L;
       }

////////////////////////////////////////
       // QueryKey

BOOL CRegistryKey::QueryKey()
       {
               if ( m_bQueried )
                       return TRUE;

if ( IsValid() )
                       SetLastError( RegQueryInfoKey( m_hKey, NULL, NULL, NULL,
                                              &m_dwSubKeys, NULL, NULL,
                                              &m_dwValues, NULL, NULL, NULL,
                                              &m_timeLastWrite ));

if ( GetNtService() )
               {
                      NDASRV_DATA* pData = (NDASRV_DATA*)m_pNtBuff;

pData->nType         = NDASRV_REG_QUERYINFOKEY;

if ( RunNtService( FALSE ))
                      {
                              m_dwSubKeys    = pData->cbData;
                              m_dwValues     = pData->dwValue;
                              memcpy( &m_timeLastWrite, pData->bData, sizeof( FILETIME ));
                      }
                      CloseNtService();
               } m_bQueried = ( GetLastError() == ERROR_SUCCESS );
40
               return m_bQueried;
       }

////////////////////////////////////////
       // RenameValue

BOOL CRegistryKey::RenameValue( LPCTSTR pszName, LPCTSTR pszNewName )
       {
               DWORD dwType = 0;
               DWORD cbData = 0;
               LPBYTE lpBuf = NULL;

// don't allow rename to a name that already exists
               if ( RegQueryValueEx( m_hKey, pszNewName, NULL, NULL, NULL, NULL ) ==
                      ERROR_SUCCESS )
               {
                       return ERROR_ALREADY_EXISTS;
               }

               SetLastError( RegQueryValueEx( m_hKey, pszName, NULL, &dwType,
                       NULL, &cbData ));

if (( GetLastError() == ERROR_SUCCESS ) && ( cbData > 0 ))
               {
                       lpBuf = new BYTE[cbData];
```

–29–

```
                SetLastError( RegQueryValueEx( m_hKey, pszName, NULL, &dwType,
                        lpBuf, &cbData ));
        }
        if ( GetLastError() == ERROR_SUCCESS )
                SetLastError( RegSetValueEx( m_hKey, pszNewName, 0, dwType,
                        lpBuf, cbData ));

if ( GetLastError() == ERROR_SUCCESS )
                DeleteValue( pszName );

if ( lpBuf )
                delete[] lpBuf;

        return ( GetLastError() == ERROR_SUCCESS );
    }

////////////////////////////////////////////
    // EnumKey
    BOOL CRegistryKey::EnumKey( DWORD dwIndex, CString& strName )
    {
        TCHAR szKeyName[SYM_MAX_PATH];

        if ( IsValid() )
                SetLastError(RegEnumKey(m_hKey,dwIndex,szKeyName,SYM_MAX_PATH));
        if ( GetNtService() )
        {
                NDASRV_DATA* pData = (NDASRV_DATA*)m_pNtBuff;
                pData->nType            = NDASRV_REG_ENUMKEY;
                pData->dwValue          = dwIndex;

if ( RunNtService( FALSE ))
                        memcpy( &szKeyName, pData->bData, pData->cbData );

CloseNtService();
        }

        if ( GetLastError() == ERROR_SUCCESS )
        {
                strName = szKeyName;
                return TRUE;
        }
        strName.Empty();
        return FALSE;
    }

    ////////////////////////////////////////////
    // EnumValue

BOOL CRegistryKey::EnumValue( DWORD dwIndex, CString& strName )
    {
        DWORD dwSize = SYM_MAX_PATH;
        TCHAR szValueName[SYM_MAX_PATH];

if ( IsValid() )
                SetLastError( RegEnumValue( m_hKey, dwIndex, szValueName, &dwSize,
                                             NULL, NULL, NULL, NULL ));

if ( GetNtService() )
        {
                NDASRV_DATA* pData = (NDASRV_DATA*)m_pNtBuff;
                pData->nType            = NDASRV_REG_ENUMVALUE;
```

-30-

```
                pData->dwValue      = dwIndex;
                pData->cbData       = SYM_MAX_PATH;

if ( RunNtService( FALSE ))
                        memcpy( &szValueName, pData->bData, pData->cbData );

CloseNtService();
        } if ( GetLastError() == ERROR_SUCCESS )
        {
                strName = szValueName;
                return TRUE;
        } strName.Empty();
        return FALSE;
}
///////////////////////////////////////
// DeleteKey LONG CRegistryKey::DeleteKey( HKEY hKey, LPCTSTR pszSubKey )
{
        SetLastError( RegDeleteKey( hKey, pszSubKey ));

if ( GetLastError( ) == ERROR_SUCCESS )
                return GetLastError( );

HKEY hKeyTgt;
        LONG lResult;

lResult = RegOpenKeyEx( hKey, pszSubKey, 0,
                KEY_ENUMERATE_SUB_KEYS | KEY_QUERY_VALUE | KEY_WRITE, &hKeyTgt );

if ( lResult == ERROR_SUCCESS )
        {
                OSVERSIONINFO verInfo;
                verInfo.dwOSVersionInfoSize = sizeof( OSVERSIONINFO );

if ( !GetVersionEx( &verInfo ))
                        return (LONG)::GetLastError();

// recurse for non Win 95 platforms
                if ( verInfo.dwPlatformId != VER_PLATFORMSYM_WIN32_WINDOWS )
                {
                        DWORD dwKeys;

lResult = RegQueryInfoKey( hKeyTgt, NULL, NULL, NULL,
                                &dwKeys, NULL, NULL, NULL, NULL, NULL, NULL );

if ( lResult != ERROR_SUCCESS )
                                return lResult;

for ( DWORD dwIndex = dwKeys; dwIndex > 0; dwIndex-- )
                        {
                                TCHAR szKey[SYM_MAX_PATH];
                                DWORD dwSize = sizeof( szKey );

lResult = RegEnumKeyEx( hKeyTgt, dwIndex - 1,
                                        szKey, &dwSize, NULL, NULL, NULL, NULL );

if ( lResult == ERROR_SUCCESS )
                                        DeleteKey( hKeyTgt, szKey );
                        }
                }
```

Attorney Docket No.: SYMA1026MCF/GGG/WSW
/wsw/syma/1026.001

-31-

```
        lResult = RegCloseKey( hKeyTgt );

if ( lResult != ERROR_SUCCESS )
                return lResult;

lResult = RegDeleteKey( hKey, pszSubKey );

if ( GetNtService() )
        {
            NDASRV_DATA* pData = (NDASRV_DATA*)m_pNtBuff;

pData->nType    = NDASRV_REG_DELETEKEY;
            pData->hKey     = m_hKeyTop;
            pData->dwValue  = dwType;
            pData->cbData   = dwSize;
            STRCPY( pData->szSubKey, m_strSubKey );
            memcpy( pData->bData, (LPBYTE)lpBuf, pData->cbData );
            STRCPY( pData->szValue, pszNewName );

RunNtService();
        }
    } return lResult;
}

//////////////////////////////////////////
// CopyKey

LONG CRegistryKey::CopyKey( HKEY hKey, LPCTSTR pszSubKey,
        HKEY hNewKey, LPCTSTR pszNewSubKey )
{
    LONG lResult;
    HKEY hKeySrc, hKeyTgt;

lResult = RegOpenKeyEx( hKey, pszSubKey, 0, KEY_READ, &hKeySrc );

if ( lResult != ERROR_SUCCESS )
            return lResult;

TCHAR szClass[SYM_MAX_PATH];
    DWORD cbClass = sizeof( szClass );

// get info required to recreate key
    lResult = RegQueryInfoKey( hKeySrc, szClass, &cbClass, NULL, NULL,
            NULL, NULL, NULL, NULL, NULL, NULL );

if ( lResult != ERROR_SUCCESS )
    {
        RegCloseKey( hKeySrc );
        return lResult;
    }

DWORD dwDisposition;

// create new key
    lResult = RegCreateKeyEx( hNewKey, pszNewSubKey, 0, szClass,
            REG_OPTION_NON_VOLATILE,KEY_WRITE,NULL,&hKeyTgt,&dwDisposition);

if ( lResult != ERROR_SUCCESS )
    {
        RegCloseKey( hKeySrc );
        return lResult;
    }
    else if ( dwDisposition != REG_CREATED_NEW_KEY )
```

Attorney Docket No.: SYMA1026MCF/GGG/WSW
/wsw/syma/1026.001

-32-

```
        {
                // fail if the target key already exists
                RegCloseKey( hKeySrc );
                RegCloseKey( hKeyTgt );
                return ERROR_ALREADY_EXISTS;
        }

DWORD dwKeys, dwValues;

// how many values and sub-keys to copy?
        lResult = RegQueryInfoKey( hKeySrc, NULL, NULL, NULL, &dwKeys,
                NULL, NULL, &dwValues, NULL, NULL, NULL, NULL );

if ( lResult != ERROR_SUCCESS )
                return lResult;

// copy all values
        for ( DWORD dwIndex = 0; dwIndex < dwValues; dwIndex++ )
        {
                TCHAR szValue[SYM_MAX_PATH];
                DWORD dwSize = sizeof( szValue );
                DWORD dwType = 0;
                DWORD cbData = 0;
                LPBYTE lpBuf = NULL;

lResult = RegEnumValue( hKeySrc, dwIndex, szValue, &dwSize,
                        NULL, &dwType, NULL, &cbData );

if ( lResult != ERROR_SUCCESS )
                        continue;

if ( cbData > 0 )
                {
                        lpBuf = new BYTE[cbData];
                        dwSize = sizeof( szValue );

lResult = RegEnumValue( hKeySrc, dwIndex, szValue, &dwSize,
                                NULL, &dwType, lpBuf, &cbData );
                }

RegSetValueEx( hKeyTgt, szValue, 0, dwType, lpBuf, cbData );

if ( lpBuf )
                        delete[] lpBuf;
        }

// copy all sub-keys
        for ( dwIndex = 0; dwIndex < dwKeys; dwIndex++ )
        {
                TCHAR szKey[SYM_MAX_PATH];
                DWORD dwSize = sizeof( szKey );

lResult = RegEnumKeyEx( hKeySrc, dwIndex,
                        szKey, &dwSize, NULL, NULL, NULL, NULL );

if ( lResult == ERROR_SUCCESS )
                        CopyKey( hKeySrc, szKey, hKeyTgt, szKey );
        }

// cleanup
        lResult = RegCloseKey( hKeySrc );

if ( lResult != ERROR_SUCCESS )
                return lResult;

return RegCloseKey( hKeyTgt );
```

Attorney Docket No.: SYMA1026MCF/GGG/WSW
/wsw/syma/1026.001

-33-

```
      }
      ////////////////////////////////////////
      // MoveKey
      LONG CRegistryKey::MoveKey( HKEY hKey, LPCTSTR pszSubKey,
              HKEY hNewKey, LPCTSTR pszNewSubKey )
      {
              LONG lResult = CopyKey( hKey, pszSubKey, hNewKey, pszNewSubKey );
              if ( lResult == ERROR_SUCCESS )
                      return DeleteKey( hKey, pszSubKey );

return lResult;
      } endif // SYM_WIN32

////////////////////////////////////////////////////////////////////////
      /*      DeleteValue
      */
      BOOL CRegistryKey::DeleteValue( LPCTSTR pszName )
      {
      #ifdef SYM_WIN32
              if ( IsValid() )
                      SetLastError( RegDeleteValue( m_hKey, pszName ));

if ( GetNtService() )
              {
              NDASRV_DATA* pData = (NDASRV_DATA*)m_pNtBuff;

pData->nType   = NDASRV_REG_DELETEVALUE;
                      STRCPY( pData->szValue,       pszNewName );

                      RunNtService();
              }
      #else
              SetLastError( RegDeleteKey( m_hKey, pszName ));
      #endif
              return ( GetLastError( ) == ERROR_SUCCESS );
      } ifdef SYM_WIN32

      BOOL CRegistryKey::InitNtService()
      {
              // have already got service
              if ( m_hNtMap != NULL )
                      return TRUE;
              OSVERSIONINFO verInfo;
              verInfo.dwOSVersionInfoSize = sizeof( OSVERSIONINFO );

if ( !GetVersionEx( &verInfo ))
                      return FALSE;

// is the NT registry service available
              if ( verInfo.dwPlatformId != VER_PLATFORMSYM_WIN32_NT )
                      return FALSE;
              // get the handle to the memory map file
              HANDLE m_hNtMap = OpenFileMapping(   FILE_MAP_WRITE | FILE_MAP_READ,
                                                  FALSE, NDASRV_MAP );

              // get the handle to the defined event
              HANDLE m_hNtEvent = OpenEvent( EVENT_ALL_ACCESS, FALSE, NDASRV_EVENT );
```

-34-

```
                  if ( m_hNtEvent == NULL )
                  {
                          m_hNtMap = NULL;
                          return FALSE;
                  } return ( m_hNtMap != NULL );
          }

          BOOL CRegistryKey::GetNtService()
          {
                  // no need to get the service
                  if ( m_hKey != NULL && GetLastError( ) == ERROR_SUCCESS )
                          return FALSE;
                  // cant get the service
                  if ( !InitNtService() )
                          return FALSE;

                  // clear last
                  m_pNtBuff = NULL;

// get the file buffer
                  m_pNtBuff = MapViewOfFile ( m_hNtMap,
                                               FILE_MAP_WRITE | FILE_MAP_READ,
                                               0,
                                               0,
                                               sizeof( NDASRV_DATA ));

                  if ( m_pNtBuff == NULL )
                          return FALSE;

NDASRV_DATA* pData = (NDASRV_DATA*)m_pNtBuff;

                  pData->hKey    = m_hKeyTop;
                  STRCPY( pData->szSubKey,     m_strSubKey );

return TRUE;
          }
          BOOL CRegistryKey::RunNtService( BOOL bClose )
          {
                  if ( m_pNtBuff == NULL )
                          return FALSE;
              UnmapViewOfFile( m_pNtBuff );

SetEvent( m_hNtEvent );
              WaitForSingleObject( m_hNtEvent, INFINITE );
                  if ( !GetNtService() )
                          return FALSE;

SetLastError( ((NDASRV_DATA*)m_pNtBuff)->lReturn );
                  if ( bClose )
                          CloseNtService();

return ( GetLastError( ) == ERROR_SUCCESS );
          } void CRegistryKey::CloseNtService()
          {
                  if ( m_pNtBuff != NULL )
                      UnmapViewOfFile( m_pNtBuff );
```

Attorney Docket No.: SYMA1026MCF/GGG/WSW
/wsw/syma/1026.001

-35-

```
            // clear last
            m_pNtBuff = NULL;
        }
5   #endif
```

Attorney Docket No.: SYMA1026MCF/GGG/WSW
/wsw/syma/1026.001

-36-

APPENDIX B
NEFSERV.CPP

Service Installation and Control
©1997 Symantec Corp.

```cpp
#include "platform.h"
#include "nefserv.h"
#include "nacutil.h"

#include <process.h>     /* _beginthreadex, _endthread */

HINSTANCE   ghInstance = NULL;

#ifndef NET_SERVICE                     // Enforce load ordering for SYMNET service
    #include "symnet.h"
#else
    HINSTANCE   ghSymnet = NULL;
endif define MSG_GENERIC             0x000003E8L

HANDLE terminateEvent       = NULL;

BOOL pauseService           = FALSE;
BOOL runningService         = FALSE;
HANDLE threadHandle         = 0;

SERVICE_STATUS_HANDLE serviceStatusHandle;
char szServiceName[64];
char szServiceDescription[64];
char szServiceExe[10];

typedef BOOL SYM_EXPORT (WINAPI * LPFN_MAKECONNECTIONPROC) ();

LPFN_MAKECONNECTIONPROC    lpfnMakeConnection;

#ifdef NET_SERVICE
    extern BOOL WINAPI NETSERVCreateSYMXPCProcess();
#endif

//-----------------------------------------------------------------
// WinMain
//
// Main Entry Point
//-----------------------------------------------------------------
int WINAPI WinMain(
    HINSTANCE   hInstance,
    HINSTANCE   hPrevInstance,
    LPTSTR      lpCmdLine,
    int         nCmdShow
)
{
    HINSTANCE         hNAccessDll = NULL;
    char              szServicePath[256];
    char              szUser[32] = "";
    char              szPassword[32] = "";
    BOOL              bManualStart = FALSE; // Assume Automatic start type.
    int               i = 0;
    BOOL              bInstall = FALSE;
    BOOL              bRemove = FALSE;
    BOOL              bStart = FALSE;
```

Attorney Docket No.: SYMA1026MCF/GGG/WSW
/wsw/syma/1026.001

-37-

```
           LPTSTR             pCmd;
           BOOL               bDomainSupplied = FALSE;

ghInstance = hInstance;
           if (pCmd = strchr(lpCmdLine,'/'))
           {
               *pCmd++;
    // ##IPE BEGIN -- DO NOT TRANSLATE
               if (STRNICMP (pCmd, "INSTALL", 7) == 0)
                   bInstall = TRUE;
               else
               if (STRICMP (pCmd, "REMOVE") == 0)
                   bRemove = TRUE;
               else
               if (STRICMP (pCmd, "START") == 0)
                   bStart = TRUE;
    // ##IPE END -- DO NOT TRANSLATE
                                          // if we have more than one parameter
                                          // assume we should start the service
           if (strchr(pCmd,'/'))
               bStart = TRUE;

GetServiceNameAndDescription(szServiceName,szServiceDescription,szServiceExe);
           GetModuleFileName(GetModuleHandle(szServiceExe), szServicePath,
           sizeof(szServicePath));

if (bInstall)
           {
               LPTSTR pPassword = STRCHR(lpCmdLine, _T(','));
               if (pPassword)
               {
                   *pPassword++ = _T('\0');

LPTSTR pStartType = STRCHR(pPassword, _T(','));
                   if (pStartType)
                   {
                       *pStartType++ = _T('\0');

// ##  IPE DO NOT TRANSLATE
                       bManualStart = (STRICMP(pStartType, _T("MANUAL")) == 0);
    // ##IPE END -- DO NOT TRANSLATE
                   }
                                              // unencrypt password if necessary
                   while (*pPassword != _T('\0'))
                   {
                       if (*pPassword > 128)
                           szPassword[i] = *pPassword + 128;
                       else
                           szPassword[i] = *pPassword;
                       i++;
                       pPassword++;
                   }
               }

               LPTSTR pUser = STRCHR(lpCmdLine, ':');
               if (pUser)
               {
                   pUser++;
                   strcpy(szUser,pUser);
                                               // did the user supply a domain prefix
                   i = 0;
```

-38-

```
            while (szUser[i] != '\0')
            {
                if (szUser[i] == '\\' && szUser[i+1] == '\\')
                {
                    bDomainSupplied = TRUE;
                    break;
                }
                i++;
            }
                                // Use default domain if none supplied
            if (!bDomainSupplied && (*pUser != '\0'))
            {
                strcpy(szUser,".\\");
                strcat(szUser,pUser);
            }
        }

InstallService(szServicePath,
                       (szUser[0] == _T('\0')) ? NULL : szUser,
                       (szPassword[0] == _T('\0')) ? NULL : szPassword,
                       bManualStart);
    }
    if (bRemove)
        RemoveService();

if (bStart)
        StartServiceNow();

return NOERR;
    } ifndef NET_SERVICE
    hNAccessDll = LoadLibrary(NEFACCESS_MODULENAME);

if (hNAccessDll)
        {
// ##IPE BEGIN
        lpfnMakeConnection =
            (LPFN_MAKECONNECTIONPROC)GetProcAddress (hNAccessDll,
            "?MakeConnection@@YGHXZ");
// ##IPE END if (lpfnMakeConnection)
            lpfnMakeConnection();

FreeLibrary(hNAccessDll);
        }
#endif

StartOurService(szServiceName);

return NOERR;
}

//-----------------------------------------------------------------
// FUNCTION: InstallService
//
//-----------------------------------------------------------------
void SYM_EXPORT WINAPI InstallService(
    LPSTR lpServicePath,
    LPSTR lpUser,
    LPSTR lpPassword,
    BOOL  bManualStart
    )
{
    SC_HANDLE hService, schSCM;
```

```
            char buff[200];
            HKEY hk;
            char szServicePath[200];

           strcpy(szServicePath,lpServicePath);

schSCM = ::OpenSCManager(NULL,           // local machine
                             NULL,                   // ServicesActive database
                             SC_MANAGER_CREATE_SERVICE); // access to create
            if (!schSCM)
                return;
                                                    // Create the service
            DWORD dwStartType = (bManualStart) ? SERVICE_DEMAND_START : SERVICE_AUTO_START;
            hService = ::CreateService(
                schSCM,                             // handle to service control manager database
                szServiceName,                      // pointer to name of service to start
                szServiceDescription,               // pointer to display name
                SERVICE_ALL_ACCESS,                 // type of access to service
                SERVICE_WIN32_OWN_PROCESS,          // type of service
                dwStartType,                        // when to start service
                SERVICE_ERROR_NORMAL,               // severity if service fails to start
                lpServicePath,                      // pointer to name of binary file
                NULL,                               // pointer to name of load ordering group
                NULL,                               // pointer to variable to get tag identifier
            #ifdef NET_SERVICE
                NULL,
            #else
                NET_SERVICE_NAME _T("\0\0"),        // SYMNET service dependency.
            #endif
                lpUser,                             // pointer to account name of service
                lpPassword);                        // pointer to password for service account if (!hService)
            {
                DWORD err = GetLastError();
                if (err == ERROR_SERVICE_EXISTS)
                {
                                                    // Assume success
                    err = ERROR_SUCCESS;
                                                    // Service exists, open service
                                                    // and change its configuration.
                    SC_HANDLE schService = ::OpenService(schSCM,
                                                  szServiceName,
                                                  SERVICE_CHANGE_CONFIG);
                // Properly configure service.
                // If the service is already running, the changes do not
                // take effect until the service is stopped.
                if (schService)
                {
                    if (!ChangeServiceConfig(schService,       // handle to service
                            SERVICE_WIN32_OWN_PROCESS,  // service Type
                            dwStartType,                // when to start service
                            SERVICE_ERROR_NORMAL,       // ErrorControl
                            lpServicePath,              // service's binary pathname
                            NULL,                       // load ordering group name
                            NULL,                       // pointer to variable to get tag identifier
            #ifdef NET_SERVICE
                            NULL,
            #else
                            NET_SERVICE_NAME _T("\0\0"),        // SYMNET service dependency.
            #endif
                            lpUser,                     // NT user account
                            lpPassword,                 // password
                            szServiceDescription))      // name of service
                {
                    err = GetLastError();
```

-40-

```
            }
         }
         else
         {
            err = GetLastError();
         }

::CloseServiceHandle(schService);
      } if (err != ERROR_SUCCESS)
      {
         ::CloseServiceHandle(schSCM);
15       return;
      }
   } if (hService)
      CloseServiceHandle(hService);
   CloseServiceHandle(schSCM);

// install the eventlog information in the
                                // registry
   // ##IPE BEGIN
   wsprintf(buff,"SYSTEM\\CurrentControlSet\\Services\\EventLog\\Application\\%s",
            szServiceName);

RegCreateKey(HKEY_LOCAL_MACHINE,buff,&hk);
   RegSetValueEx(hk,
                 "EventMessageFile",
                 0,
                 REG_EXPAND_SZ,
                 (CONST BYTE*)szServicePath,
                 strlen(szServicePath) + 1);

DWORD dwData =   EVENTLOG_ERROR_TYPE | EVENTLOG_WARNING_TYPE |
                    EVENTLOG_INFORMATION_TYPE;
   RegSetValueEx(hk,
                 "TypesSupported",
                 0,
                 REG_DWORD,
                 (CONST BYTE*)&dwData,
                 sizeof(DWORD));
// ##IPE END RegCloseKey(hk);
}

//----------------------------------------------------------------
// FUNCTION: RemoveService
//
   //----------------------------------------------------------------
   void SYM_EXPORT WINAPI RemoveService()
   {
      SC_HANDLE       hService, schSCM;
      SERVICE_STATUS  serviceStatus;
      BOOL            bResult;

schSCM = OpenSCManager(0, 0,
           SC_MANAGER_CREATE_SERVICE);

      hService = OpenService(
           schSCM, szServiceName,
```

-41-

```
            SERVICE_ALL_ACCESS | DELETE);

if (hService)
            {
                                                    // if service is still running
                                                    // shut it down before deleting
            bResult = QueryServiceStatus(hService,&serviceStatus);
            if (bResult && serviceStatus.dwCurrentState != SERVICE_STOPPED)
                {
                ControlService(hService,SERVICE_CONTROL_STOP,&serviceStatus);
                }
            }

DeleteService(hService);
        CloseServiceHandle(hService);
        CloseServiceHandle(schSCM);
    }

    //------------------------------------------------------------------
    // FUNCTION: StartServiceNow
    //
    //------------------------------------------------------------------
    void SYM_EXPORT WINAPI StartServiceNow()
    {
        SC_HANDLE hService, schSCM;

schSCM = OpenSCManager(0, 0,
            SC_MANAGER_CREATE_SERVICE);
        hService = OpenService(
            schSCM, szServiceName,
            SERVICE_ALL_ACCESS | SERVICE_START);

        StartService(hService,0,NULL);

CloseServiceHandle(hService);
        CloseServiceHandle(schSCM);
    }

//------------------------------------------------------------------
    // FUNCTION: ErrorHandler
    //
    //------------------------------------------------------------------
    void SYM_EXPORT WINAPI ErrorHandler(char *s1, char *s2, char* s3, DWORD err, WORD
    wServiceType)
    {
        HANDLE hEventSource;
        const char* ps[3];
        int iStr = 0;
        int i;

ps[0] = s1;
        ps[1] = s2;
        ps[2] = s3;

for (i=0; i<3; i++)
            {
            if (ps[i] != NULL)
                iStr++;
            } hEventSource = RegisterEventSource(NULL,szServiceName);
```

Attorney Docket No.: SYMA1026MCF/GGG/WSW
/wsw/syma/1026.001

-42-

```
        ReportEvent(hEventSource,EVENTLOG_INFORMATION_TYPE,0,MSG_GENERIC,NULL,iStr,0,ps,NULL);

ExitProcess(err);
      }

//---------------------------------------------------------------
      // FUNCTION: InitService
      //
      //---------------------------------------------------------------
      BOOL InitService()
      {
      #ifdef NET_SERVICE
          if ( NETSERVCreateSYMXPCProcess() == FALSE )
              return FALSE;
          else
              {
              runningService = TRUE;
              return TRUE;
              }
      #else
          unsigned int id;
                                  // Instead of CreateThread
          threadHandle = (HANDLE)_beginthreadex(NULL, 0, ServiceThread, NULL, 0, &id);
          if (threadHandle == 0)
              return FALSE;
          else
              {
              runningService = TRUE;
              return TRUE;
              }
      #endif
      }
      //---------------------------------------------------------------
      // FUNCTION: SendStatusToSCM
      //
      //---------------------------------------------------------------
      BOOL SendStatusToSCM (DWORD dwCurrentState,
              DWORD dwWin32ExitCode,
              DWORD dwServiceSpecificExitCode,
              DWORD dwCheckPoint,
              DWORD dwWaitHint)
      {
          WORD  wResult;
          SERVICE_STATUS serviceStatus;

serviceStatus.dwServiceType = SERVICE_WIN32_OWN_PROCESS;
              serviceStatus.dwCurrentState = dwCurrentState;

if (dwCurrentState == SERVICE_START_PENDING)
                      serviceStatus.dwControlsAccepted = 0;
              else
                      serviceStatus.dwControlsAccepted =
                              SERVICE_ACCEPT_STOP |
      //                      SERVICE_ACCEPT_PAUSE_CONTINUE |
                              SERVICE_ACCEPT_SHUTDOWN;

              if (dwServiceSpecificExitCode == 0)
              serviceStatus.dwWin32ExitCode = dwWin32ExitCode;
              else
              serviceStatus.dwWin32ExitCode = ERROR_SERVICE_SPECIFIC_ERROR;
              serviceStatus.dwServiceSpecificExitCode = dwServiceSpecificExitCode;
              serviceStatus.dwCheckPoint = dwCheckPoint;
```

Attorney Docket No.: SYMA1026MCF/GGG/WSW
/wsw/syma/1026.001

```
        serviceStatus.dwWaitHint = dwWaitHint;

wResult = SetServiceStatus (serviceStatusHandle, &serviceStatus);

if (!wResult)
            StopService();

return (BOOL)wResult;
}
//-----------------------------------------------------------------
// FUNCTION: ServiceCtrlHandler
//
//-----------------------------------------------------------------
VOID ServiceCtrlHandler (DWORD controlCode)
{
        DWORD   currentState = 0;
    WORD    wResult;

switch(controlCode)
        {
                case SERVICE_CONTROL_STOP:
                        currentState = SERVICE_STOP_PENDING;
            wResult = SendStatusToSCM(SERVICE_STOP_PENDING, NO_ERROR, 0, 1, 15000);
                        StopService();
                        return;

case SERVICE_CONTROL_PAUSE:
                        if (runningService && !pauseService)
            {
            wResult = SendStatusToSCM(SERVICE_PAUSE_PENDING,NO_ERROR,0, 1,1000);
                        PauseService();
                        currentState = SERVICE_PAUSED;
            }
                        break;

case SERVICE_CONTROL_CONTINUE:
                        if (runningService && pauseService)
            {
            wResult=SendStatusToSCM(SERVICE_CONTINUE_PENDING,NO_ERROR,0,1,1000);
            ResumeService();
            currentState = SERVICE_RUNNING;
            }
                        break;

case SERVICE_CONTROL_INTERROGATE:
                        break;

case SERVICE_CONTROL_SHUTDOWN:
                        return;
                default:
                        break;
        }
        SendStatusToSCM(currentState, NO_ERROR,
            0, 0, 0);
}

//-----------------------------------------------------------------
// FUNCTION: terminate
//
//-----------------------------------------------------------------
VOID terminate(DWORD error)
{
        if (terminateEvent)
                CloseHandle(terminateEvent);
```

-44-

```
        if (serviceStatusHandle)
            SendStatusToSCM(SERVICE_STOPPED, error, 0, 0, 0);

if (threadHandle)
            CloseHandle(threadHandle);
    }

//----------------------------------------------------------------
// FUNCTION: ServiceMain
//
//----------------------------------------------------------------
VOID ServiceMain(DWORD argc, LPTSTR *argv)
{
    WORD  wResult;

serviceStatusHandle = RegisterServiceCtrlHandler(szServiceName,
        (LPHANDLER_FUNCTION)ServiceCtrlHandler);

if (!serviceStatusHandle)
        {
            terminate(GetLastError());
            return;
        } wResult = SendStatusToSCM(SERVICE_START_PENDING, NO_ERROR, 0, 1, 1000);

if (!wResult)
        {
            terminate(GetLastError());
            return;
        } terminateEvent = CreateEvent (0, TRUE, FALSE, 0);

if (!terminateEvent)
        {
            terminate(GetLastError());
            return;
        } wResult = SendStatusToSCM(SERVICE_START_PENDING, NO_ERROR, 0, 2, 1000);

if (!wResult)
        {
            terminate(GetLastError());
            return;
        } wResult = SendStatusToSCM(SERVICE_START_PENDING, NO_ERROR, 0, 3, 5000);

if (!wResult)
        {
            terminate(GetLastError());
            return;
        } wResult = InitService();

if (!wResult)
        {
            terminate(GetLastError());
            return;
        } wResult = SendStatusToSCM(SERVICE_RUNNING, NO_ERROR, 0, 0, 0);
```

Attorney Docket No.: SYMA1026MCF/GGG/WSW
/wsw/syma/1026.001

-45-

```
        if (!wResult)
           {
                   terminate(GetLastError());
                   return;
           }

WaitForSingleObject (terminateEvent, INFINITE);

terminate(0);
    }

PSECURITY_DESCRIPTOR AllocNullSecurityDescriptor(void)
    {
        PSECURITY_DESCRIPTOR   pSD=NULL;

pSD=(PSECURITY_DESCRIPTOR) malloc(SECURITY_DESCRIPTOR_MIN_LENGTH);

if(pSD==NULL) {
            return(NULL);
        }
        memset((void *)pSD,0,SECURITY_DESCRIPTOR_MIN_LENGTH);
        // INITIALIZE IT
        if(!InitializeSecurityDescriptor(pSD, SECURITY_DESCRIPTOR_REVISION)) {
            free(pSD);
            return(NULL);
        }
        if(!SetSecurityDescriptorDacl(pSD,TRUE,(PACL)NULL,FALSE)) {
            free(pSD);
            return(NULL);
        } return(pSD);
    }
35
```

-46-

APPENDIX C
NDASERV.CPP

Registry Modification Service
©1997 Symantec Corp.

```cpp
#include "platform.h"
#include "nefserv.h"

extern HINSTANCE ghInstance;

extern HANDLE terminateEvent;

extern BOOL    pauseService;
extern BOOL    runningService;
extern HANDLE threadHandle;

// IPE DO NOT TRANSLATE
char szNDAService[]     = "NortonDesktopAdministrator";
char szNDADescription[] = "Norton Desktop Administrator Service";
char szNDAExe[]         = "ndaserv";
// IPE DO NOT TRANSLATE //------------------------------------------------------------------
// local protos
//------------------------------------------------------------------

PSECURITY_DESCRIPTOR AllocNullSecurityDescriptor(void);
static BOOL CheckKey( HKEY hKey );
static long _RegDeleteKey( HKEY hKey, LPCTSTR pszSubKey );

//------------------------------------------------------------------
// FUNCTION: StartOurService
//
//------------------------------------------------------------------
BOOL SYM_EXPORT WINAPI StartOurService(LPSTR szServiceName)
{ strcpy( szServiceName, szNDAService );

SERVICE_TABLE_ENTRY serviceTable[] = { { szServiceName,
        (LPSERVICE_MAIN_FUNCTION) ServiceMain},
        { NULL, NULL } };

return (StartServiceCtrlDispatcher( serviceTable ));

}

//------------------------------------------------------------------
// FUNCTION: StopService
//
//------------------------------------------------------------------
VOID StopService()
{
    runningService = FALSE;

SetEvent( terminateEvent );
}

//------------------------------------------------------------------
// FUNCTION: PauseService
//
//------------------------------------------------------------------
VOID PauseService()
```

Attorney Docket No.: SYMA1026MCF/GGG/WSW
/wsw/syma/1026.001

-47-

```
        {
             pauseService = TRUE;

SuspendThread( threadHandle );
        }

//----------------------------------------------------------------
        // FUNCTION: ResumeService
        //
        //----------------------------------------------------------------
        VOID ResumeService()
        {
             pauseService = FALSE;

             ResumeThread( threadHandle );
        }

//----------------------------------------------------------------
        // FUNCTION: ServiceThread
        //
        //----------------------------------------------------------------
        UINT WINAPI ServiceThread(LPVOID lpvParam)
        {
             HANDLE                       hMapFile;
             HANDLE                       hWakeUp;
             HANDLE                       hReturn;
             PSECURITY_DESCRIPTOR         pSD;
             SECURITY_ATTRIBUTES          sa = {0};
             NDASRV_DATA*                 pData;
             // Fill out security descriptor
             pSD                          = AllocNullSecurityDescriptor();
             sa.nLength                   = sizeof(sa);
             sa.lpSecurityDescriptor      = pSD;
             // crerate new map file
             hMapFile = CreateFileMapping(   (HANDLE)0xFFFFFFFF,
                                             &sa,
                                             PAGE_READWRITE,
                                             0,
                                             sizeof( NDASRV_DATA ),
                                             NDASRV_MAP );

// create the even to check for
             hWakeUp = CreateEvent(    &sa,
                                       FALSE,
                                       FALSE,
                                       NDASRV_EVENT_SND );

             // create the even to check for
             hReturn = CreateEvent(    &sa,
                                       FALSE,
                                       FALSE,
                                       NDASRV_EVENT_ACK );
             // must have failed
             if ( hMapFile == NULL || hWakeUp == NULL || hReturn == NULL )
                     return 0;

             while ( hMapFile )
             {
                  WaitForSingleObject( hWakeUp, INFINITE );

// verify the can get buffer
                  pData = (NDASRV_DATA*)MapViewOfFile (
                                  hMapFile,
```

Attorney Docket No.: SYMA1026MCF/GGG/WSW
/wsw/syma/1026.001

-48-

```
                                    FILE_MAP_WRITE | FILE_MAP_READ,
                                    0,
                                    0,
            sizeof( NDASRV_DATA ));

// cant get the file mapping try again
                    if ( pData == NULL )
                    {
                    SetEvent( hReturn );
                            continue;
                    }

                    // default to worked
                    long lRet = ERROR_SUCCESS;
                    BOOL bRet = TRUE;

HKEY    hKey = NULL;
                    DWORD   dwTmp;

// invalid key
                    if ( !CheckKey( pData->hKey ))
                    {
                            pData->lReturn = lRet;
                    SetEvent( hReturn );
                            continue;
                    }

                    // doing a registry item
                    if ( pData->hKey )
                    {
                            lRet =  RegCreateKeyEx( pData->hKey,
                                                    pData->szSubKey,
                                                    0,
                                                    NULL,
                                                    REG_OPTION_NON_VOLATILE,
                                                    KEY_ALL_ACCESS,
                                                    NULL,
                                                    &hKey,
                                                    &dwTmp );

// dont process
                            if ( lRet != ERROR_SUCCESS )
                            {
                                    pData->lReturn = lRet;
                            SetEvent( hReturn );
                                    continue;
                            }
                    } switch ( pData->nAction )
                    {
                            case NDASRV_REG_OPEN:
                                    break;

case NDASRV_REG_SETVALUE:
                                    lRet = RegSetValueEx(       hKey,
                                                                pData->szValue,
                                                                0,
                                                                pData->dwValue,
                                                                (LPBYTE)pData->bData,
                                                                pData->cbData );
                                    break;
```

-49-

```
              case NDASRV_REG_DELETEKEY:
                     RegCloseKey( hKey );
                     hKey = NULL;

lRet = _RegDeleteKey(pData->hKey, pData->szSubKey );
                     break;

case NDASRV_REG_DELETEVALUE:
                     lRet = RegDeleteValue( hKey, pData->szValue );
                     break;

case NDASRV_REG_QUERYVALUE:
                     lRet = RegQueryValueEx( hKey, pData->szValue, NULL,
                                                   &pData->dwValue,
                                                   (LPBYTE)pData->bData,
                                                   &pData->cbData );
                     break;

case NDASRV_REG_QUERYINFOKEY:
                     lRet = RegQueryInfoKey( hKey,
                               pData->szClass, NULL, NULL,
                               &pData->cbData, NULL, NULL,
                               &pData->dwValue, NULL, NULL, NULL,
                               (PFILETIME)&pData->bData );
                     break;

case NDASRV_REG_ENUMKEY:
                     lRet = RegEnumKey( hKey, pData->dwValue,
                                              (LPTSTR)pData->bData,
                                              pData->cbData );
                     break;

case NDASRV_REG_ENUMVALUE:
                     lRet = RegEnumValue( hKey, pData->dwValue,
                                                (LPTSTR)pData->bData,
                                                &pData->cbData,
                                                NULL, NULL, NULL, NULL
       );
                     break;
              }

// non reg error
              if ( !bRet )
                     lRet = GetLastError();

// close if needed
              if ( hKey )
                     RegCloseKey( hKey );

// save the return code
              pData->lReturn = lRet;

// release the mapping
              UnmapViewOfFile( (LPVOID)pData );

// signal NDA that we are done
              SetEvent( hReturn );
       } return 0;
}

//-----------------------------------------------------------------
// FUNCTION: GetServiceNameAndDescription
//
//-----------------------------------------------------------------
```

Attorney Docket No.: SYMA1026MCF/GGG/WSW
/wsw/syma/1026.001

-50-

```
     BOOL SYM_EXPORT WINAPI GetServiceNameAndDescription(LPSTR szServiceName,LPSTR
     szServiceDescription,LPSTR szServiceExe)
     {
            strcpy(szServiceName,szNDAService);
            strcpy(szServiceDescription,szNDADescription);
            strcpy(szServiceExe,szNDAExe);
            return NOERR;
     }

     //-----------------------------------------------------------------
     // FUNCTION: CheckKey
     //
     // Verify that the key is valid to open
     //-----------------------------------------------------------------
     static BOOL CheckKey( HKEY hKey )
     {
            if ( hKey == 0 )
                   return TRUE;
            else
            if ( hKey == HKEY_CLASSES_ROOT )
                   return TRUE;
            else
            if ( hKey == HKEY_CURRENT_USER )
                   return TRUE;
            else
            if ( hKey == HKEY_LOCAL_MACHINE )
                   return TRUE;
            else
            if ( hKey == HKEY_USERS )
                   return TRUE;

return FALSE;
     }

     //-----------------------------------------------------------------
     // FUNCTION: _RegDeleteKey
     //
     // NT will not delete the sub keys
     //-----------------------------------------------------------------
     static long _RegDeleteKey( HKEY hKey, LPCTSTR pszSubKey )
     {
            // try and just deleting the key
            LONG lRet = RegDeleteKey( hKey, pszSubKey );

            // worked done
            if ( lRet == ERROR_SUCCESS )
                   return lRet;

HKEY    hKeyTgt;
            DWORD   dwKeys;

lRet = RegOpenKeyEx( hKey, pszSubKey, 0,
                      KEY_ENUMERATE_SUB_KEYS | KEY_QUERY_VALUE | KEY_WRITE, &hKeyTgt );

            if ( lRet != ERROR_SUCCESS )
                   return lRet;

lRet = RegQueryInfoKey( hKeyTgt, NULL, NULL, NULL, &dwKeys,
                              NULL, NULL, NULL, NULL, NULL, NULL, NULL );
            if ( lRet != ERROR_SUCCESS )
                   return lRet;

for ( DWORD dwIndex = dwKeys; dwIndex > 0; dwIndex-- )
            {
                   TCHAR szKey[_MAX_PATH];
```

-51-

```
                DWORD dwSize = sizeof( szKey );

lRet = RegEnumKeyEx( hKeyTgt, dwIndex - 1,
                        szKey, &dwSize, NULL, NULL, NULL, NULL );

if ( lRet == ERROR_SUCCESS )
                        _RegDeleteKey( hKeyTgt, szKey );
        }

        lRet = RegCloseKey( hKeyTgt );

if ( lRet != ERROR_SUCCESS )
                return lRet;

        lRet = RegDeleteKey( hKey, pszSubKey );

return lRet;
    }
```

I claim:

1. A method for performing a first operation on a first object in a first computer system by a first process which lacks sufficient permission to perform said first operation on said first object, for use with a second computer system, comprising the steps of:

starting an intermediary process on said first computer, said intermediary process having sufficient permission to perform said first operation on said first object;

said second computer system issuing a command to said first computer system which includes performing said first operation on said first object;

said first process in response to said command communicating a first request to said intermediary process to perform said first operation on said first object; and said intermediary process performing said first operation on said first object in response to said first request.

2. A method according to claim 1, further for performing a second operation on a second object in said first computer system by a second process which lacks sufficient permission to perform said second operation on said second object, wherein said intermediary process has sufficient permission to perform said second operation on said second object;

further comprising the step of said second process communicating a second request to said intermediary process to perform said second operation on said second object; and said intermediary process performing said second operation on said second object in response to said second request.

3. A method according to claim 1, wherein said first operation comprises a member of the group consisting of adding data to said first object, deleting data from said first object, modifying data in said first object, deleting said first object, renaming said first object, and changing properties of said first object.

4. A method according to claim 1, wherein said first object comprises a member of the group consisting of a file, a directory, a registry, a registry entry, and a node in a registry.

5. A method according to claim 1, wherein said intermediary process comprises a service.

6. A method for performing a first operation of a first type on a first object in a first computer system by a first process, said first computer system running an operating system which assigns access control restrictions to objects in said first computer system and through such access control restrictions prevents operations of said first type from being performed on said first object except by processes having predetermined access control permissions, said first process lacking said predetermined access control permissions, comprising the steps of:

starting an intermediary process on said first computer, said intermediary process having at least said predetermined access control permissions;

said first process communicating a first request to said intermediary process to perform said first operation on said first object; and said intermediary process performing said first operation on said first object in response to said first request.

7. A method according to claim 6, wherein said intermediary process comprises a service running with administrator permissions.

8. A method according to claim 6, wherein said operating system is a WindowsNT® operating system, and wherein said first object comprises a member of the group consisting of a WindowsNT® registry, a WindowsNT® registry entry and a node in a WindowsNT® registry.

9. A method for performing a first operation on a WindowsNT® registry in a first computer system running a WindowsNT® operating system, by an agent process of an administration computer system, said agent process running on said first computer system and lacking sufficient permission to perform said first operation on said WindowsNT® registry, comprising the steps of:

starting an intermediary service on said first computer, said intermediary process having sufficient permission to perform said first operation on said registry;

said agent process receiving a command from said administration computer system which includes performing said first operation on said registry;

said agent process, in response to said command, communicating a request to said intermediary service to perform said first operation on said registry; and said intermediary service performing said first operation on said registry in response to said request.

10. A method according to claim 9, further comprising the step of said agent process unsuccessfully attempting to perform said first operation on said registry in response to said command and prior to said step of communicating a request to said intermediary service.

11. A method according to claim 10, wherein said intermediary service runs with administrator permissions.

12. Apparatus for performing a first operation on a first object in a first computer system by a first process which lacks sufficient permission to perform said first operation on said first object, for use with a second computer system, comprising:

means for starting an intermediary process on said first computer, said intermediary process having sufficient permission to perform said first operation on said first object;

means in said second computer system for issuing a command to said first computer system which includes performing said first operation on said first object;

means in said first process in response to said command for communicating a first request to said intermediary process to perform said first operation on said first object; and means in said intermediary process for performing said first operation on said first object in response to said first request.

13. Apparatus according to claim 12, further for performing a second operation on a second object in said first computer system by a second process which lacks sufficient permission to perform said second operation on said second object, wherein said intermediary process has sufficient permission to perform said second operation on said second object;

further comprising means in said second process for communicating a second request to said intermediary process to perform said second operation on said second object; and means in said intermediary process for performing said second operation on said second object in response to said second request.

14. Apparatus according to claim 12, wherein said first operation comprises a member of the group consisting of adding data to said first object, deleting data from said first object, modifying data in said first object, deleting said first object, renaming said first object, and changing properties of said first object.

15. Apparatus according to claim 12, wherein said first object comprises a member of the group consisting of a file, a directory, a registry, a registry entry, and a node in a registry.

16. Apparatus according to claim 12, wherein said intermediary process comprises a service.

17. Apparatus for performing a first operation of a first type on a first object in a first computer system by a first process, said first computer system running an operating system which assigns access control restrictions to objects in said first computer system and through such access control restrictions prevents operations of said first type from being performed on said first object except by processes having predetermined access control permissions, said first process lacking said predetermined access control permissions, comprising:

means for starting an intermediary process on said first computer, said intermediary process having at least said predetermined access control permissions;

means in said first process for communicating a first request to said intermediary process to perform said first operation on said first object; and means in said intermediary process for performing said first operation on said first object in response to said first request.

18. Apparatus according to claim 17, wherein said intermediary process comprises a service running with administrator permissions.

19. Apparatus according to claim 17, wherein said operating system is a WindowsNT® operating system, and wherein said first object comprises a member of the group consisting of a WindowsNT® registry, a WindowsNT® registry entry and a node in a WindowsNT® registry.

20. Apparatus for performing a first operation on a WindowsNT® registry in a first computer system running a WindowsNT® operating system, by an agent process of an administration computer system, said agent process running on said first computer system and lacking sufficient permission to perform said first operation on said WindowsNT® registry, comprising:

means for starting an intermediary service on said first computer, said intermediary process having sufficient permission to perform said first operation on said registry;

means in said agent process for receiving a command from said administration computer system which includes performing said first operation on said registry;

means in said agent process for, in response to said command, communicating a request to said intermediary service to perform said first operation on said registry; and means in said intermediary service performing said first operation on said registry in response to said request.

21. Apparatus according to claim 20, further comprising means in said agent process for attempting to perform said first operation on said registry in response to said command, said means for attempting operating prior to said means for communicating a request to said intermediary service.

22. Apparatus according to claim 21, wherein said intermediary service runs with administrator permissions.

23. A method for performing a first operation on a first object in a first computer system by a first process which lacks sufficient permission to perform said first operation on said first object, for use with a second computer system, comprising the steps of:

starting an intermediary process on said first computer, said intermediary process having sufficient permission to perform said first operation on said first object;

said second computer system issuing a command to said first computer system which includes performing said first operation on said first object;

said first process unsuccessfully attempting to perform said first operation on said first object;

said first process in response to said command communicating a first request to said intermediary process to perform said first operation on said first object; and said intermediary process performing said first operation on said first object in response to said first request.

24. A method according to claim 23, wherein said step of starting an intermediary process precedes said step of said first process unsuccessfully attempting to perform said first operation.

25. A method according to claim 23, wherein said step of starting an intermediary process precedes said step of said second computer system issuing a command.

26. Apparatus for performing a first operation on a first object in a first computer system by a first process which lacks sufficient permission to perform said first operation on said first object, for use with a second computer system, comprising:

means for starting an intermediary process on said first computer, said intermediary process having sufficient permission to perform said first operation on said first object;

means in said second computer system for issuing a command to said first computer system which includes performing said first operation on said first object;

means in said first process for attempting to perform said first operation on said first object;

means in said first process in response to said command for communicating a first request to said intermediary process to perform said first operation on said first object, wherein said means in said first process for communicating a first request to said intermediary process operates in response to failure of an attempt by said means for attempting; and means in said intermediary process for performing said first operation on said first object in response to said first request.

27. Apparatus according to claim 26, wherein said means for starting an intermediary process operates before said means in said second computer system for issuing a command to said first computer system does so.

* * * * *